(12) United States Patent
Howes

(10) Patent No.: US 9,247,849 B1
(45) Date of Patent: Feb. 2, 2016

(54) CYLINDRICAL COOKING SURFACE DEVICE

(71) Applicant: Michael J. Howes, Phoenix, AZ (US)

(72) Inventor: Michael J. Howes, Phoenix, AZ (US)

(*) Notice: Subject to any disclaimer, the term of this patent is extended or adjusted under 35 U.S.C. 154(b) by 32 days.

(21) Appl. No.: 14/169,489

(22) Filed: Jan. 31, 2014

(51) Int. Cl.
| | |
|---|---|
| *A22C 7/00* | (2006.01) |
| *A23P 1/00* | (2006.01) |
| *A47J 43/18* | (2006.01) |
| *A47J 37/06* | (2006.01) |
| *A47J 37/07* | (2006.01) |
| *A47J 37/04* | (2006.01) |
| *A23L 1/01* | (2006.01) |

(52) U.S. Cl.
CPC .................. *A47J 37/041* (2013.01); *A23L 1/01* (2013.01); *A47J 37/049* (2013.01)

(58) Field of Classification Search
CPC .............. A47J 37/0611; A47J 37/0704; A47J 37/0694; A47J 37/041; A47J 37/049; A47J 37/0763; A47J 27/0813; A21B 3/155
USPC ............... 99/331, 337, 339, 394, 402, 421 A, 99/421 R, 427, 443 R, 449, 450
See application file for complete search history.

(56) References Cited

U.S. PATENT DOCUMENTS

| | | | |
|---|---|---|---|
| 3,315,591 A * | 4/1967 | Elliott .......................... 99/421 R |
| 3,529,536 A * | 9/1970 | Milhem .......................... 99/346 |
| 4,436,024 A * | 3/1984 | Arden et al. .............. 99/421 HV |
| 5,355,778 A * | 10/1994 | Mayfield et al. ................. 99/441 |
| 5,421,318 A * | 6/1995 | Unruh et al. ................. 126/25 A |
| 5,445,063 A * | 8/1995 | Sherman ................. A47J 43/18 |
| | | | 211/85.4 |
| 5,471,915 A * | 12/1995 | Lopata ................. A47J 37/042 |
| | | | 99/419 |
| 5,497,697 A * | 3/1996 | Promny .......................... 99/427 |
| 6,079,319 A * | 6/2000 | Doria .............................. 99/331 |
| 6,220,152 B1 * | 4/2001 | Baldwin et al. ................. 99/427 |
| 6,497,175 B2 * | 12/2002 | Behm ............................ 99/427 |
| D474,379 S * | 5/2003 | Nelson et al. .................. D7/683 |
| 7,478,586 B2 * | 1/2009 | Gabrielle ........................ 99/340 |
| 7,514,651 B2 * | 4/2009 | Popeil et al. .................. 219/392 |
| 2007/0101869 A1 * | 5/2007 | Gelfand ........................ 99/419 |
| 2009/0277339 A1 * | 11/2009 | Andrade ........................ 99/427 |
| 2011/0097468 A1 * | 4/2011 | Driscoll et al. ............... 426/519 |

* cited by examiner

*Primary Examiner* — Dana Ross
*Assistant Examiner* — Hemant Mathew
(74) *Attorney, Agent, or Firm* — Thomas W. Galvani, P.C.; Thomas W. Galvani

(57) ABSTRACT

A cooking device includes a cylindrical cooking surface mounted for rotation about a horizontal axis proximate to a heat source. The cooking surface defines a sidewall bounding an interior. Rotation of the cooking surface engenders relative movement between the cooking surface and food applied to the interior and maintains direct contact between the cooking surface and the food so as to cook the food with thermal conduction.

11 Claims, 4 Drawing Sheets

CYLINDRICAL COOKING SURFACE DEVICE

FIELD OF THE INVENTION

The present invention relates generally to cooking, and more particularly to devices for cooking and marinating food.

BACKGROUND OF THE INVENTION

There are numerous ways of preparing food for consumption. From drying beef on a rack to microwaving a frozen dinner, methods of preparation are as varied as the needs, tools, and technology of the cook doing the preparation. Some cooks may prefer food that can be cooked quickly, such as with a microwave, so that the food can be consumed as soon as possible. Other cooks may prefer equipment that allows them to cook food in a communal and festive atmosphere, like a luau pit or a campfire. Some cooks may choose cooking equipment that keeps food under pressure to cook it faster, such as a dutch oven, while others may prefer a machine that places the food on display, such as a rotisserie. Still other cooks may desire food that is dried and crunchy, such as jerky, while others may want food that has been simmered and marinated in juice.

Different cooking devices were developed to meet different cooking needs. For instance, a shallow cooking pan is an essential kitchen item, because it can be used to cook a wide variety of foods. A shallow cooking pan can be used to prepare foods such as eggs, sauces, pancakes, meats, and other foods. Meats can sometimes be difficult to cook in a pan, however, because the temperature and time required to cook a piece of meat—depending on the thickness of the cut—can sometimes cause the meat to dry out. Juices added to the pan, or juices which are let off by the meat, can boil or evaporate from the pan. Fortunately, pans can be covered with a lid, which traps moisture, helps the meat retain its own juices, and prevents the loss of the juices which provide so much flavor to the meat.

Similarly, many food items can be difficult to cook because of the difficulty in judging the balance between adequately cooking the food for safety and palatability, and not overly cooking the food to the point of drying or burning it. This is primarily caused by the difficulty in determining an appropriate temperature and time of cooking. One method many cooks use to avoid over cooking a food item is stirring or constantly moving the food. Many cooks will swirl a food around a pan, or stir a food with a ladle or whisk. This movement allows the cook to expose all parts of the food to higher heat than would be possible without such movement.

For instance, in cooking a sauce, a small pot is often used. Heat is provided by a burner or an inductive or electrical element underneath the pot. The pot, made of metal, will become warm, and will become warm over all its surfaces. However, the bottom of the pot will often times be slightly hotter than the walls of the pot. When the sauce is not stirred, heat will, to an extent, be distributed throughout the sauce in the pot, but the sauce laying near the bottom of the pot will often be the hottest. If left to sit on the bottom of the pot, that sauce can cook faster, or even burn. However, by stirring the sauce frequently, the cook accomplishes two things: first, he distributes the heat from the pot more evenly throughout the sauce by convection (actually moving the hotter portions of the sauce and diffusing them to the cooler portions of the sauce); and second, he prevents any sauce from burning against the bottom of the pot. In this way, by stirring the sauce, the cook can prepare a sauce faster than he would be able to without stirring, he can prevent burning of the sauce, and he can likely use higher heat to cook the sauce more quickly.

A cook's careful attention is often required to create such movement in the food. Continuous attention is not always possible, however, and devices such as microwave ovens or rotisseries were developed to cook food without constant monitoring. Microwave ovens provide relative movement between food and a heat source, but many people are adverse to cooking larger meals through microwave ovens, the idea of "nuking" one's food being a turn-off. Further, microwave ovens can often cook a food unevenly. A rotisserie also provides relative movement between food and a heat source, but rotisserie foods can generally take quite a long time to cook because of the relatively low heat used for cooking. Accordingly, there is a need for a device which quickly cooks food without drying or overcooking that food.

SUMMARY OF THE INVENTION

According to the principle of the invention, a cylindrical cooking surface device is a cylindrical cooking surface mounted for rotation about a horizontal axis. Lips are formed at opposed ends of the cooking surface to contain food and juices applied to and carried on the cooking surface. The cooking surface is proximate to a heat source, and rotation of the cooking surface, preferably by a driving motor, engenders relative movement between the cooking surface and the food. Rotation of the cooking surface also maintains direct contact between the cooking surface and the food so as to cook the food with thermal conduction. With the cylindrical cooking surface device, food is cooked continuously without constant supervision, and the food is neither burnt nor dried.

BRIEF DESCRIPTION OF THE DRAWINGS

Referring to the Drawings.

DETAILED DESCRIPTION

Figure 1:
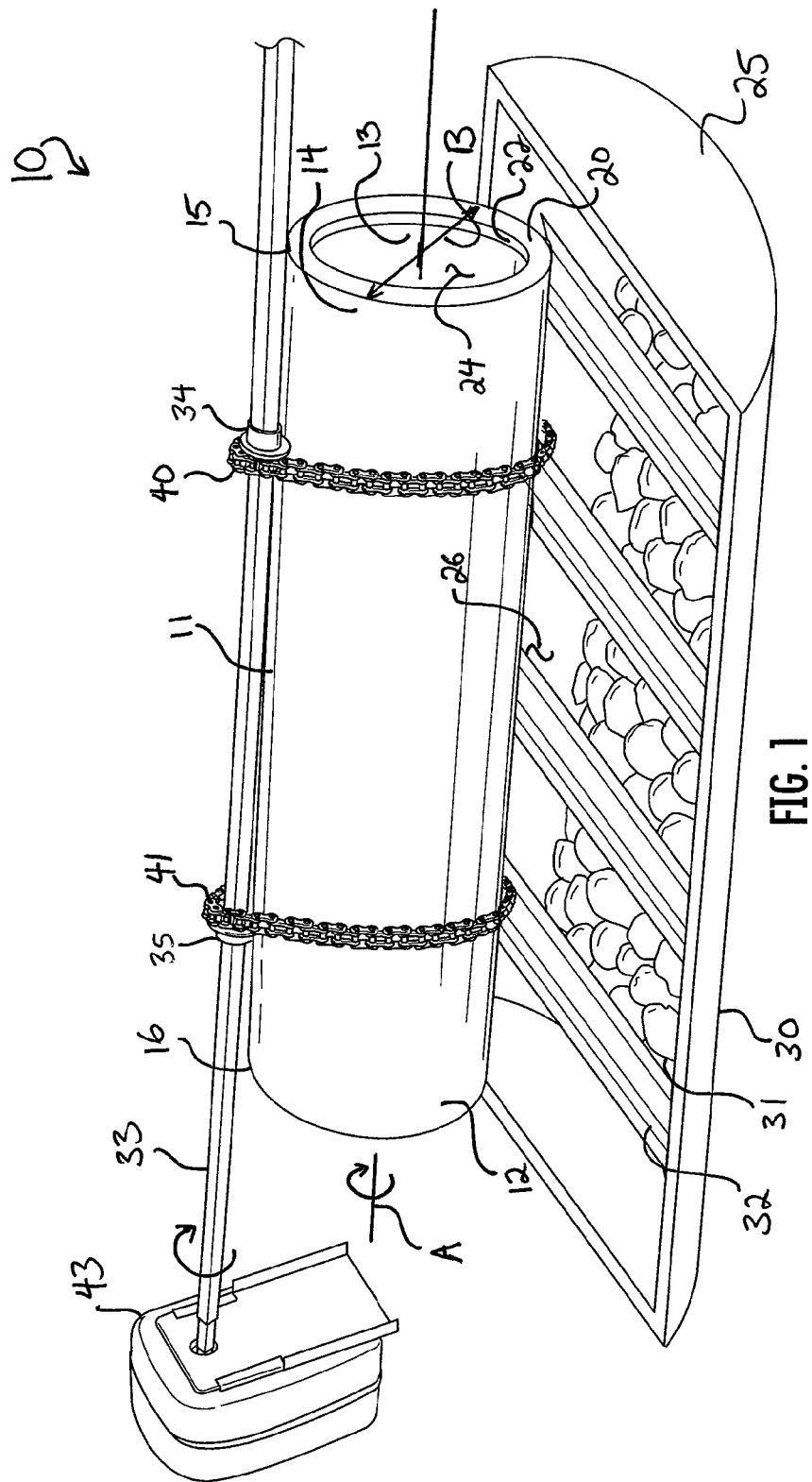
FIG. 1 is a right perspective view of a cylindrical cooking surface device constructed and arranged according to the principle of the invention.

Reference now is made to the drawings, in which the same reference characters are used throughout the different figures to designate the same elements. FIG. 1 illustrates a perspective view of a cylindrical cooking surface device 10 constructed and arranged according to the principle of the invention. The device 10 includes a body 11 with a cylindrical sidewall 12 having an inner surface 13 and an opposed outer surface 14. The inner surface 13 is a cooking surface for cooking food items placed within the cooking device 10. The body 11 is preferably constructed out of a material or combination of materials having the material characteristics of rigidity and high heat conductivity, such as metal.

Figure 2:
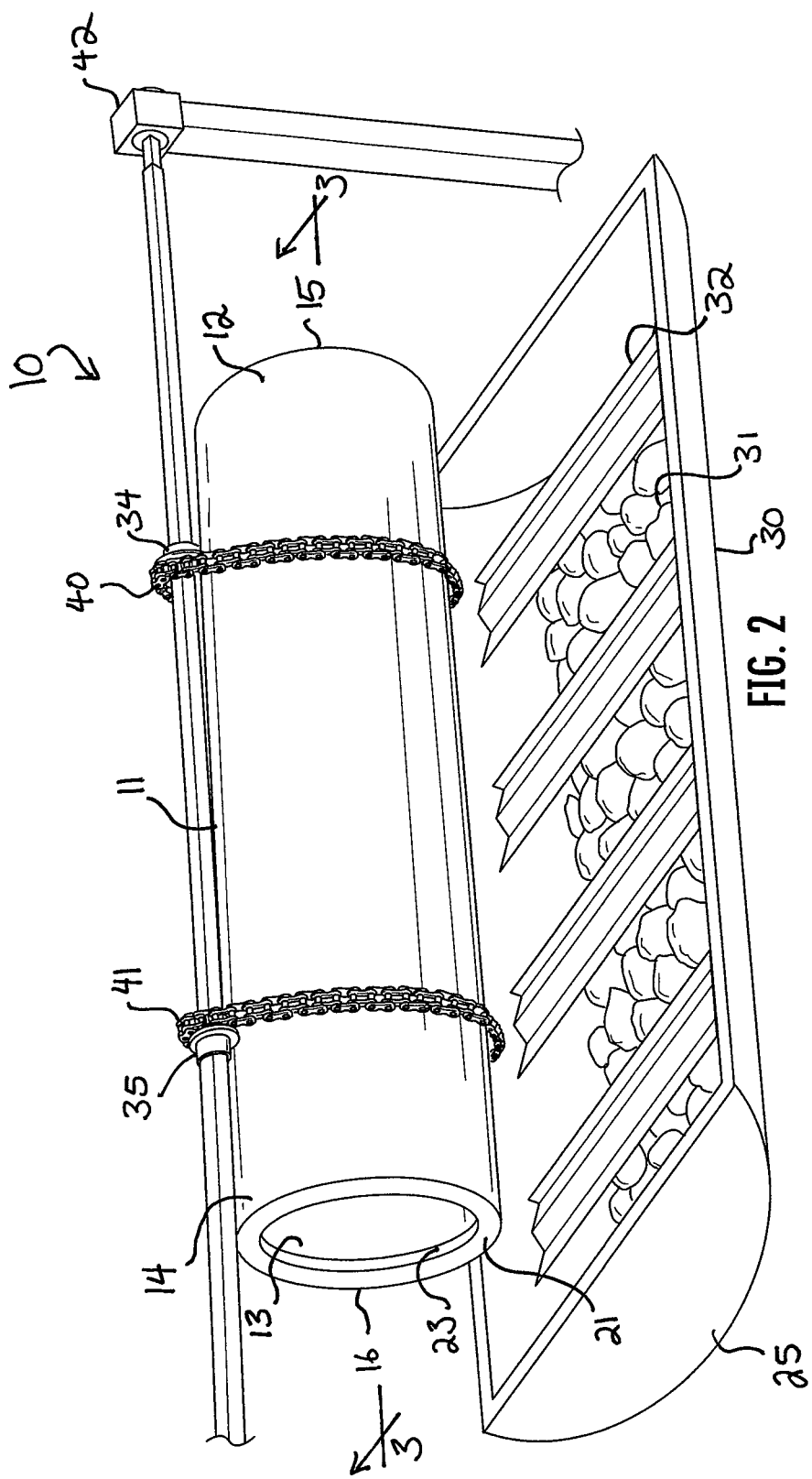
FIG. 2 is a left perspective view of the cylindrical cooking surface device of FIG. 1.

The cylindrical body 11 is elongate, and extends along an axis A identified in FIG. 1, about which the body 11 has rotational symmetry and, during operation, is rotated. The body has a diameter B, and has opposed ends 15 and 16, which are open ends. Radially-oriented, inwardly-directed lips 20 and 21 are formed at the ends 15 and 16, respectively (lip 21 is seen in FIG. 2). As used herein, the term "radial" shall mean extending along a radius transverse to the axis A and extending between the axis A of the body 10 and the sidewall 12, and "inwardly-directed" means directed toward the axis A, while "outwardly-directed" means directed away from the axis A. Further, the term "axial" means directed along or parallel to the axis A. The lips 20 and 21 each extend continuously about the open end and are thin-walled projections. The lips 20 and 21 extend radially inwardly transverse and generally perpendicularly to the sidewall 12 a distance C, which is approximately one-sixth the diameter B of the body 12, to terminal inner edges 22 and 23, respectively. In the embodiment shown in FIG. 1, the lips 20 and 21 are spaced apart from each other on either end 15 and 16, and are each monolithically and integrally formed to the sidewall 12, so that the lips 20 and 21 define fluid impervious right-angle extensions of the sidewall 12. In this way, the lips 20 and 21 cooperate with the sidewall 12 to define an annular channel 27 for holding and containing food and juices applied thereto. The channel 27, shown in FIG. 3, extends partially into the interior 24 a distance equal to the distance C of the lips 20 and 21.

The sidewall 12 of the body 11 and the lips 20 and 21 bound an interior 24 of the cooking device 10. The interior 24 is cylindrical and is encircled by the interior surface 13. The ends 15 and 16 define open end extremities of the interior 24 and provide access into the interior 24, which access is maintained during operation, during rotation, and during cooking, so that food and juices may be applied or removed as needed during cooking.

The body 11 is mounted for rotation about the axis A above a heat source 25. The axis A is horizontal with respect to the ground, and as such, the body 11 is also aligned generally horizontally with respect to the ground. The heat source 25 shown in FIGS. 1-4 is a charcoal grill including a pan 30, charcoal 31 applied to the pan 30, and a grate 32 sitting above the charcoal 31. The body 11 is spaced apart from the heat source 25 by a gap 26, separated from the heat source 25 so that the heat source 25 is not in contact with the body 11 or with the food carried in the interior 24. Heat thus passes from the heat source 25 to the body 11 by thermal convection, which is the transfer of thermal energy by the movement of a fluid. In this case, the fluid is ambient air in the gap 26 which is heated by the heat source 25, rises upward and against the sidewall 12, and then heats the sidewall 12.

The body 11 is mounted or suspended above the heat source 25. A driven axle 33 extends over the heat source 25 and two sprockets 34 and 35 are seated and secured on the axle 33. The sprockets 34 and 35 are fixed with respect to the axle 33 and each have teeth which engage with two roller-type drive chains 40 and 41, respectively. The drive chains 40 and 41 engage with the teeth on the top of the sprockets 34 and 35, and depend from the sprockets to wrap around and encircle the body 12. The body 12, constructed of a material such as metal, is heavy, and the chains 40 and 41 engage frictionally with the outer surface 14 of the body 12. The axle 33 is supported between a bearing 42 (shown in FIG. 2) and a drive motor 43, which rotates the axle 33 along a direction indicated by the arcuate arrowed line in FIG. 1. Rotation of the axle 33 imparts rotation to the sprockets 34 and 35, which in turn impart rotation to the chains 40 and 41, which in turn impart rotation to the body 12 of the cooking device 10 through frictional engagement of the outer surface 14.

Figure 3:
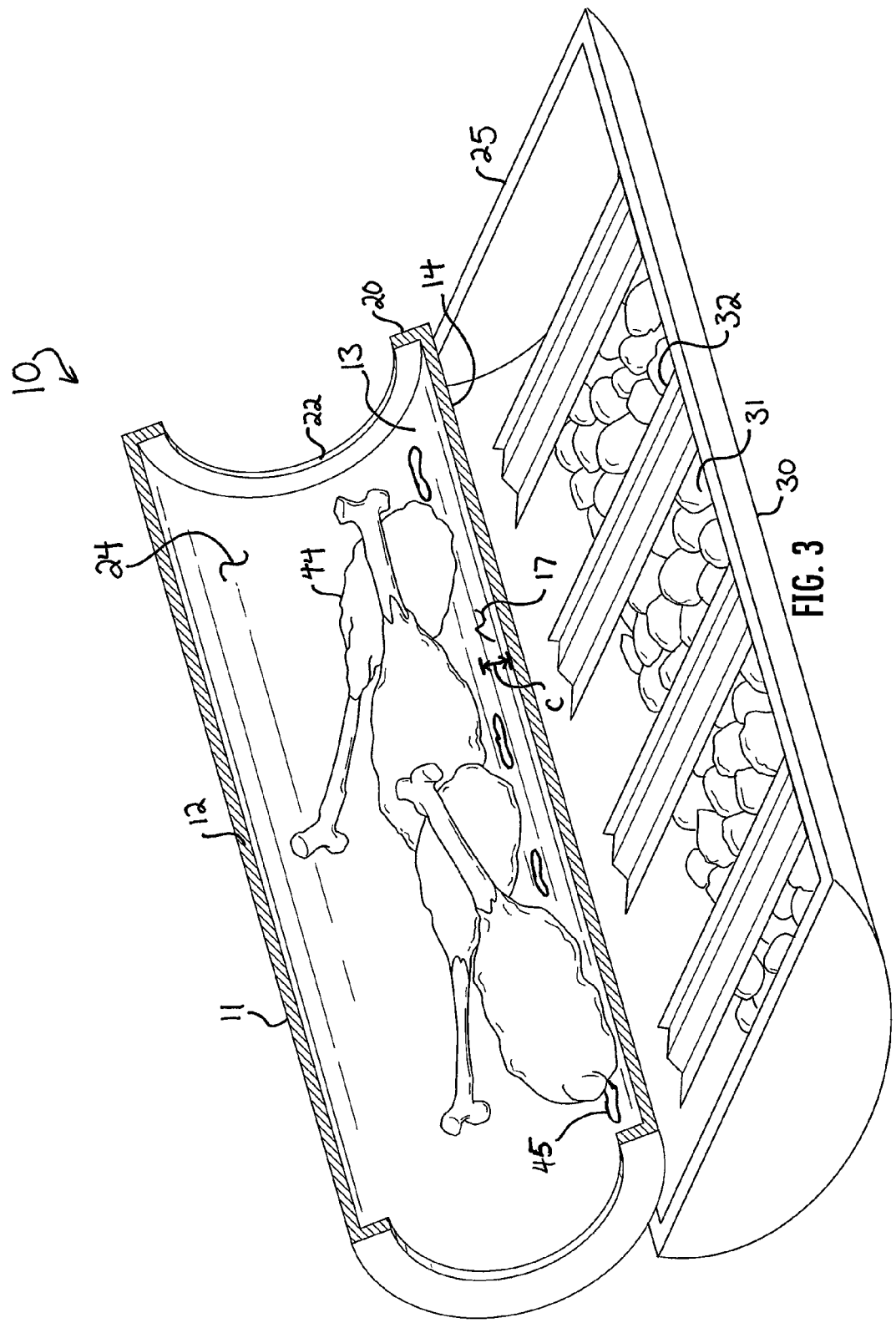
FIG. 3 is a section view of the cylindrical cooking surface device of FIG. 1 taken along the line 3-3 in FIG. 2.

Reference is now made to FIG. 3. In operation, the heat source 25 provides heat through upward convection. The heat source 25 emits thermal energy as heated air toward the body 11 of the cooking device 10, which is spaced above the heat source 25. The body 11 accumulates the heat from the air and becomes hot. Food 44 is applied to the interior 24 of the body 11, either before the body 11 becomes hot, while the body 11 becomes hot, or after the body 11 has become hot. The food 44 is applied through the open ends 15 and 16. Sauces, oils, or other liquids 45 may be applied to the interior 24 of the body 11 for the food 44 to simmer in and to add flavor or aid in the cooking of the food 44. The liquids 45 are retained in the body 11 by the lips 20 and 21, which prevent the liquids 45 from spilling or being ejected out of the body 11.

Once the food 44 is within the interior 24, the drive motor 43 is activated and begins rotating the axle 33. The axle 33 is operably coupled to impart rotation to the body 11, and rotation of the axle 33 rotates the body 11. As the body 11 rotates, the food 44 tumbles within the interior 24. Rotation of the body 11 about the axis A engenders relative motion between the inner surface 13 and the food 44 while also maintaining contact between the inner surface 13 and the food 44. The food 44 tumbles and slides on and against the inner surface 13, which is hot and heats those parts of the food 44 which are in contact with the inner surface 13. The tumbling of the food 44 within the interior 24 causes different portions of the food 44 to come into contact with the inner surface 13, and each portion which does come into contact with the inner surface 13 is heated by thermal conduction, which is the transfer of thermal energy between bodies through direct contact without material flow between those bodies. Therefore, the food 44 is continuously heated through thermal conduction on different parts of the food as a result of relative movement between the food 44 and the inner surface 13 by the rotational movement of the body 11 about the axis A. This method of cooking provides effective heating to the food 44 and prevents any part of the food 44 from maintaining contact with the inner surface 13 for more than a brief period, which prevents burning of the food, and moves the food 44 through the liquids 45, which both heat the food 44 and marinate the food 44, preventing the food 44 from becoming dry.

The liquids 45 are heated by both thermal conduction and thermal convection; although continuously moving because of the rotation of the body 11, portions of the sauces are constantly in contact with the inner surface 13 of the body 11 and thus are heated through thermal conduction. Moreover, the rotation of the body 11 which causes the liquids 45 to flow and mix within the interior 24 and against the inner surface 13 causes the liquids 45 to be heated through thermal convection, as hotter parts of the sauces, oils, or other liquids 45 are diffused to cooler parts of the liquids 45. In this way, both the food 44 and the liquids 45 are heated and cooked to a savory product.

Figure 4:
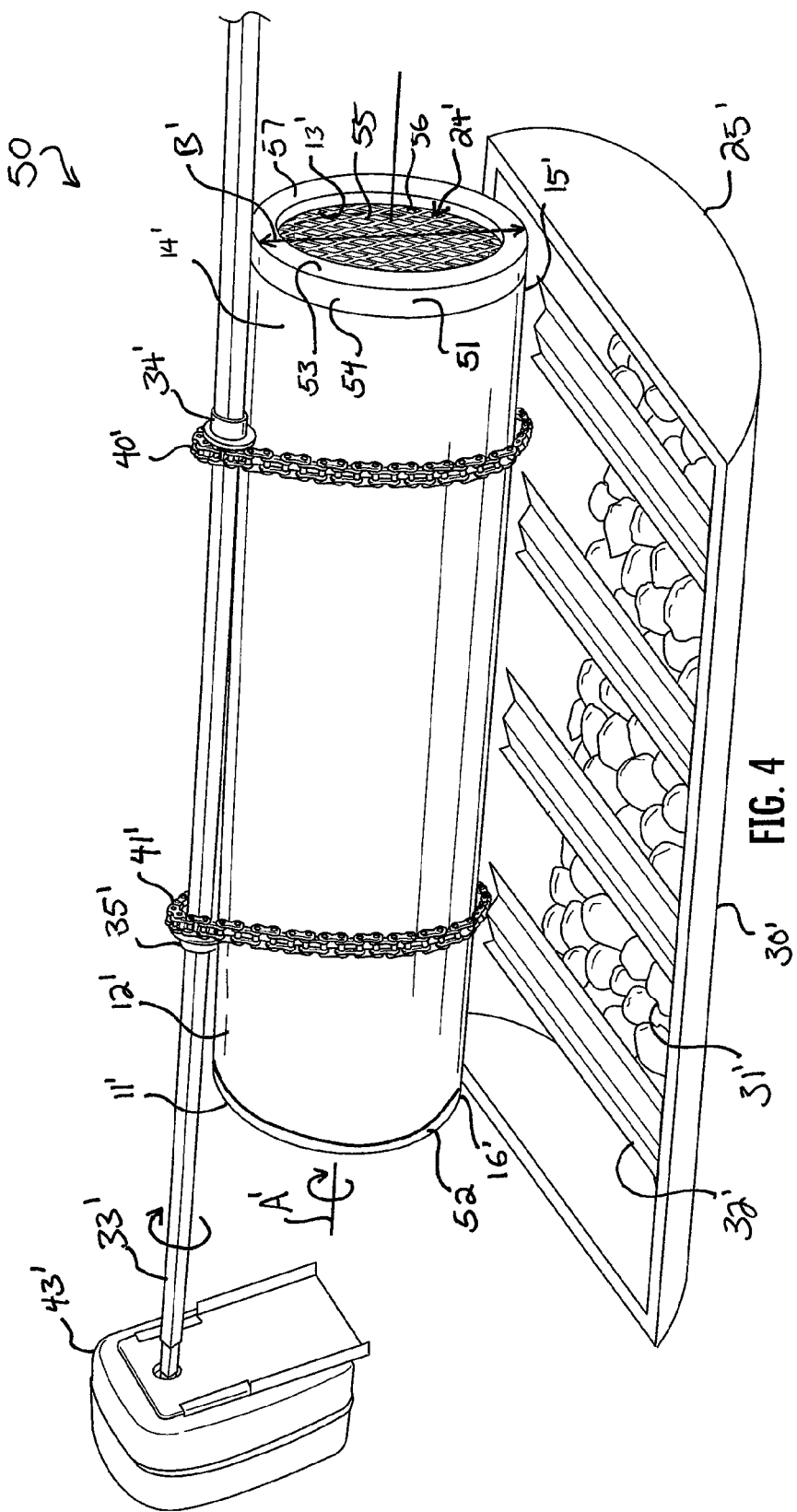
FIG. 4 is a right perspective view of an alternate embodiment of a cylindrical cooking surface device constructed and arranged according to the principle of the invention.

An alternate embodiment of a cylindrical cooking surface device 50 constructed and arranged according to the principle of the invention is shown in FIG. 4. FIG. 4 is a perspective view of the device 50 similar to that of FIG. 1. The device 50 is substantially identical to the device 10 of FIGS. 1-4, and has many structural features and elements in common with the device 10. As such, reference characters used to describe the various structural features and elements of the device 10 will also be used to describe the structural features and elements of the device 50, but will be marked with a prime symbol ("'") so as to distinguish them from those of the device 10. Accordingly, the device 50 has a body 11', sidewall 12', inner and outer surfaces 13' and 14', opposed ends 15' and 16', interior 24', axle 33', sprockets 34' and 35', drive chains 40' and 41', bearing 42' (not shown in FIG. 4), drive motor 43', axis A', and diameter B'. Additionally, the ends 15' and 16' of the device 50 are fitted with caps 51 and 52, respectively. The caps 51 and 52 are identical, and as such, only the cap 51 will be described herein since the cap 51 can be seen clearly in FIG. 4, with the understanding that the cap 52 has an identical structure but is merely applied to the end 16' rather than the end 15'. The cap 51 consists of a circular ring 53 with a continuous annular lip 54 extending axially outward from a top 57 of the ring 53. The back side of the top 57 has an inner face to which a circular mesh panel 55 is secured about its circumference. The mesh panel 55 is a thin sheet of material, preferably metal, and includes an array of openings 56 formed therethrough. Each of the openings 56 is small, and is much smaller than any food 44 applied to the device 50 so that the food 44 will not spill out of the ends 15' and 16' of the device.

The caps 51 and 52 are press fit onto the ends 15' and 16'. The caps 51 and 52 are held on the ends 15' and 16' with a press-fit or snug-fit engagement, held by friction and the tightness of the fit. In other embodiments, the caps 51 and 52 may be threaded onto the ends 15' and 16', may attach with a magnetized fastening system, or some other like fastening method. In still other embodiments, the caps 51 and 52 may be constructed out of a different material from that of the body 11, so that the caps 51 and 52 and the body 11 have different coefficients of thermal expansion, so that the caps 51 and 52 and the body 11 expand and contract at different rates. Such a discrepancy would allow the caps 51 and 52 to be fitted onto the body 11 and then, as the body 11 heats up and expands, the caps 51 and 52 would tighten on the ends 15' and 16' so that the caps 51 and 52 could not be removed from the body 11 without great force or until the body 11 cools and reduces in diameter.

Operation of the device 50 is similar to that of the device 10. The heat source 25' provides heat through upward convection, and the body 11' accumulates the heat and becomes hot. Food 44' is applied through the open ends 15' and 16' to the interior 24' of the body 11', either before the body 11' becomes hot, while the body 11' becomes hot, or after the body 11' has become hot. The caps 51 and 52 are then applied to the ends 15' and 16', respectively. Sauces, oils, or other liquids 45' may be applied to the interior 24'. The liquids 45' may be applied through the openings 56 of the mesh panel 55, or may be applied just before the caps 51 and 52 are fitted onto the body 11'. The liquids 45 are retained in the body 11 by the rings 53 of the caps 51 and 52, which prevent the liquids 45 from spilling out of the body 11'. The mesh panel 55 prevents the food 44 from being ejected out of the body 11'. When fitted onto the body 11, the caps 51 and 52 form a fluid-impervious seal with the ends 15' and 16', and define fluid impervious right-angle extensions of the sidewall 12. In this way, the liquids 45' are prevented from escaping from or leaking out of the body 11'.

Once the food 44' is within the interior 24, the drive motor 43' is activated and begins rotating the axle 33', which imparts rotation to the body 11'. As the body 11' rotates, the food 44' tumbles within the interior 24'. Rotation of the body 11' about the axis A' engenders relative motion between the inner surface 13' and the food 44' while also maintaining contact between the inner surface 13' and the food 44'. The food 44' tumbles and slides on and against the inner surface 13', which is heated and thereby heats those parts of the food 44' which are in contact with the inner surface 13'. The tumbling of the food 44' within the interior 24' causes different portions of the food 44' to come into contact with the inner surface 13', and each portion which does come into contact with the inner surface 13' is heated by thermal conduction. Therefore, the food 44' is continuously heated through thermal conduction on different parts of the food as a result of relative movement between the food 44' and the inner surface 13' by the rotational movement of the body 11' about axis A'. This method of cooking provides effective heating to the food 44' which marinates and prevents the food 44' from becoming dry.

The liquids 45' are heated by both thermal conduction and thermal convection; although continuously moving because of the rotation of the body 11', portions of the sauces are constantly in contact with the inner surface 13' of the body 11' and thus are heated through thermal conduction. Moreover, the rotation of the body 11' which causes the liquids 45' to flow across the interior 24' and against the inner surface 13' causes the liquids 45' to be heated through thermal convection, as hotter parts of the liquids 45' are diffused to cooler parts of the liquids 45'. In this way, both the food 44' and the liquids 45' are heated.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

The invention claimed is:

1. A cooking device comprising:
a cylindrical cooking surface mounted for rotation proximate to a heat source including opposed opened ends;
the cooking surface defines a sidewall bounding an interior accessible through the opposed opened ends;
a drive motor, a drive axle coupled to the drive motor, a sprocket fixed on the drive axle, at least one chain wraps around and encircles the cylindrical cooking surface, and the at least one chain engaged with the sprocket and the cooking surface to impart rotation to the cooking surface in response to rotation of the drive axle by the drive motor;
rotation of the cooking surface engenders relative movement between the cooking surface and food applied to the interior; and
rotation of the cooking surface maintains direct contact between the cooking surface and the food so as to cook the food with thermal conduction.

2. The cooking device of claim 1, wherein access to the interior is maintained during cooking.

3. The cooking device of claim 1, wherein spaced-apart, inwardly-projecting lips formed on the sidewall define an annular channel on the sidewall extending partially into the interior.

4. The cooking device of claim 1, wherein:
the cooking surface has opposed opened ends providing access to the interior; and
inwardly-projecting lips are formed at the opened ends.

5. The cooking device of claim 1, wherein a motor is coupled to impart rotation to the cooking surface.

6. The cooking device of claim 5, wherein the heat source is spaced apart and separated from the cooking surface by a gap of air.

7. A cooking device comprising:
an open-ended, cylindrical sidewall bounding an interior and mounted for rotation about an axis of rotational symmetry of the sidewall;
a drive motor, a drive axle coupled to the drive motor, a sprocket fixed on the drive axle, at least one chain wraps around and encircles the cylindrical cooking surface, and the at least one chain engaged with the sprocket and the cooking surface to impart rotation to the cooking surface in response to rotation of the drive axle by the drive motor;

the sidewall defines a heated cooking surface in direct contact with food applied to the interior; and rotation of the sidewall engenders relative movement between the heated surface and the food.

8. The cooking device of claim 7, wherein the axis is horizontal and the cylindrical sidewall is aligned horizontally.

9. The cooking device of claim 7, wherein:
the sidewall is heated by thermal convection; and
the food is heated by thermal conduction.

10. The cooking device of claim 7, wherein the sidewall has opposed opened ends providing access to the interior.

11. The cooking device of claim 7, wherein spaced-apart inwardly-projecting lips formed on the sidewall define an annular channel on the sidewall extending partially into the interior.

\* \* \* \* \*